Figure 1:
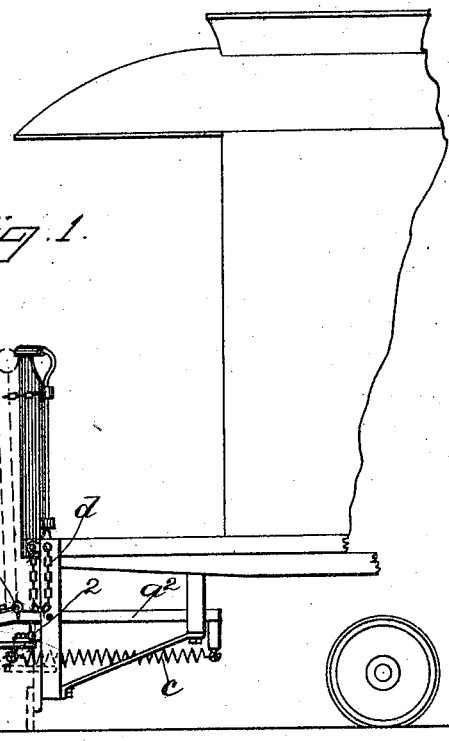

(No Model.)

C. T. GRILLEY.
CAR FENDER.

No. 502,037. Patented July 25, 1893.

WITNESSES.
Charles B. Crocker.
Jonas R. Foster.

INVENTOR.
Charles T. Grilley
by B. J. Noyes.
Atty.

UNITED STATES PATENT OFFICE.

CHARLES T. GRILLEY, OF BOSTON, MASSACHUSETTS.

CAR-FENDER.

SPECIFICATION forming part of Letters Patent No. 502,037, dated July 25, 1893.

Application filed February 28, 1893. Serial No. 464,022. (No model.)

*To all whom it may concern:*

Be it known that I, CHARLES T. GRILLEY, of Boston, county of Suffolk, State of Massachusetts, have invented an Improvement in Car-Fenders, of which the following description, in connection with the accompanying drawings, is a specification, like letters and figures on the drawings representing like parts.

This invention has for its object to improve the construction of fenders or safety devices for street cars and the like.

In accordance with this invention the fender normally projects forward as usual, and is adapted to be turned up against the dash board of the car, or to be moved horizontally inward when not in use, and a guard is provided just back of the fender and in front of or beneath the bar or beam which supports the usual hand brake, said guard being made as wide or wider than the track; and the fender is provided upon its under side with clips which engage the lower edge of the guard, and normally hold it in elevated position, but when said fender is slightly raised the said guard is released that it may assume its vertical position. A strong spring is connected to said guard so that when released it will be moved into its vertical position very quickly.

When the fender strikes an object, said object will either fall upon the fender or upon the road bed. In the latter case the fender will pass over it, and to prevent said fender from pushing or scraping over and thereby lacerating the body I have arranged a transverse roller beneath and at the forward end of the hinged fender, which roller passes smoothly and without shock over the body, the fender being lifted upon its hinges, and thereby allowing the body to pass beneath the fender unharmed. At the same time that the fender is thus lifted the clips are removed from beneath the spring actuated guard, that it may be instantly moved into its vertical position. The pressure upon the object as the fender passes over it is merely the weight of the fender, say twenty-five pounds.

The lower edge of the guard is composed of blocks of wood or other material screwed or otherwise secured to the frame, so that if said guard should strike an unyielding obstacle, as for instance a projecting paving stone, one or another of blocks would be removed without injury to the remaining portion of the guard, and a serious shock to any other part of the car would be thereby prevented, and thereafter a new block could be very easily and cheaply substituted.

Suitable means are provided for holding the guard in a partially elevated position when not in use, as for instance when at the rear end of the car.

Figure 2:
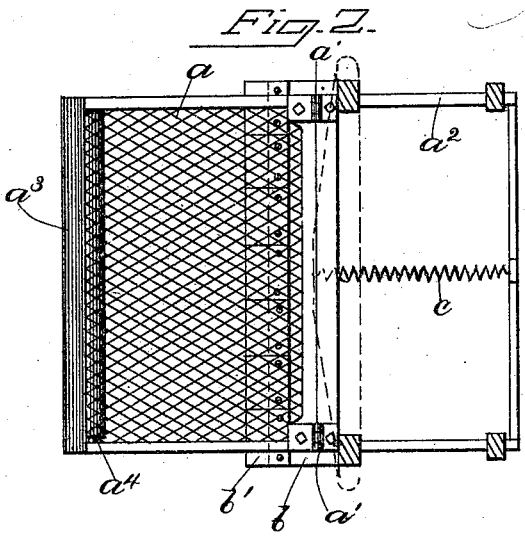

Figure 1, represents a side elevation of the fender made in accordance with this invention; Fig. 2, a plan view of the fender shown in Fig. 1.

The fender $a$, of any usual shape and size is pivoted at $a'$, to a platform or frame $a^2$, which is suitably supported beneath the forward end of the car and adapted to be moved horizontally inward when desired, or said platform or frame $a^2$ may remain in its normal position and the fender $a$ turned up in vertical position against the dash board as represented by dotted lines Fig. 1.

The fender $a$ may have at its forward end a suitable buffer $a^3$; and also just beneath the forward end of the fender $a$ a roll $a^4$ is journaled which is made as long as the width of the fender.

A guard $b$ is pivoted at 2, to a frame or suitable support in front of or beneath the beam which supports the usual hand brake extending transversely the entire width of the car, said guard being composed of the body or frame having secured to its lower end, by screws or otherwise, a series of blocks $b'$ of wood or other material, said blocks terminating so near the road bed, when the guard is in its vertical position as shown by dotted lines Fig. 1, as to prevent the limb of a person from passing beneath the same.

Two or more clips $b^2$, are secured to the under side of the fender $a$, of the guard as represented by full lines Fig. 1.

Should the fender strike an object and fail to throw it upon the fender, the roll $a^4$, will pass smoothly and without harm over the object, thereby slightly lifting the fender on its pivots sufficiently to release the guard $b$. The pressure exerted upon the object by said hinged fender will be but the weight of the fender, which will be made as light as practicable, say twenty-five pounds. A strong spring $c$ is secured at one end to the guard $b$, and at the other end to a suitable fixed point, which acts to instantly restore the guard to its vertical position whenever released, such instantaneous operation being necessary in order that the guard may occupy its vertical position, as soon as the forward end of the fender is lifted from its normal position, thereby preventing the object from passing beneath the wheels.

The clips $b^2$ herein shown form a very simple and economical way of holding the guard, one which will not get out of order and in all cases will act with absolute certainty.

A suitable chain $d$ is provided having at one end a pin which may be inserted in a hole in the frame to hold the fender withdrawn, or in another hole, beneath the guard, as represented by dotted lines to hold said guard in partial elevated position when not in use as for instance when at the rear end of the car.

By providing the lower edge of the guard with independent blocks of wood it will be seen that if one or another should be broken off new ones may be very easily and cheaply substituted.

It will be observed that the roll $a^4$, fender $a$ and guard $b$, are made the full width of the car body or substantially so, and afford protection in case the object falls upon or passes beneath the fender.

I claim—

1. A safety device for cars consisting of the combination of the pivoted fender $a$ having beneath its forward end the roller $a^4$, and having upon its under side clips $b^2$, and the pivoted guard $b$ the lower edge of which is adapted to be engaged by said clips, substantially as described.

2. A safety device for cars consisting of the combination of the pivoted fender $a$ having beneath its forward end the roller $a^4$, and having upon its under side clips $b^2$, and the pivoted guard $b$ the lower edge of which is adapted to be engaged by said clips, and the strong spring $c$ connected with and adapted to actuate said guard, substantially as described.

3. The safety device for cars consisting of the combination of the pivoted fender $a$ having beneath its forward end a roller $a^4$, and the pivoted guard $b$ normally held in its elevated position by the fender, and adapted to be released by slightly raising said fender, and a strong spring $c$ connected with said guard for instantly moving it when released, substantially as described.

4. A safety device for cars consisting of the combination of the pivoted fender $a$ having beneath its forward end the roll $a^4$, and the pivoted guard $b$ normally held in its elevated position by the fender, and adapted to be released by slightly raising said fender, and a strong spring $c$ connected with said guard for instantly moving it into its vertical position when released, and a chain or equivalent for holding said guard in partial elevated position when not in use, substantially as described.

In testimony whereof I have signed my name to this specification in the presence of two subscribing witnesses.

CHARLES T. GRILLEY.

Witnesses:
BERNICE J. NOYES,
CHARLES B. CROCKER.